United States Patent
Kallam et al.

(10) Patent No.: US 8,051,222 B2
(45) Date of Patent: Nov. 1, 2011

(54) CONCATENATING SECURE DIGITAL INPUT OUTPUT (SDIO) INTERFACE

(75) Inventors: Subba Reddy Kallam, Hyderabad (IN); Venkateswarlu Upputuri, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 184 days.

(21) Appl. No.: 12/145,514

(22) Filed: Jun. 25, 2008

(65) Prior Publication Data

US 2009/0327533 A1    Dec. 31, 2009

(51) Int. Cl.
*G06F 3/00* (2006.01)
(52) U.S. Cl. .......................................... 710/25; 710/110
(58) Field of Classification Search .................... 710/25, 710/110
See application file for complete search history.

(56) References Cited

U.S. PATENT DOCUMENTS

| | | | | |
|---|---|---|---|---|
| 4,907,225 A | * | 3/1990 | Gulick et al. ............... | 370/463 |
| 6,219,736 B1 | * | 4/2001 | Klingman ................... | 710/315 |
| 6,389,038 B1 | * | 5/2002 | Goldberg et al. ........... | 370/471 |
| 2006/0104290 A1 | * | 5/2006 | Miao ........................... | 370/401 |
| 2006/0262766 A1 | * | 11/2006 | Peleg ........................... | 370/338 |
| 2007/0195820 A1 | * | 8/2007 | So et al. ...................... | 370/470 |
| 2007/0223472 A1 | * | 9/2007 | Tachibana et al. ........... | 370/389 |
| 2008/0259950 A1 | * | 10/2008 | Visa et al. .................... | 370/458 |

* cited by examiner

*Primary Examiner* — Tariq Hafiz
*Assistant Examiner* — Aurangzeb Hassan
(74) *Attorney, Agent, or Firm* — File-EE-Patents.com; Jay A. Chesavage

(57) ABSTRACT

An apparatus and a process for transferring packet data includes receiving packets from a first interface such as a network interface and transferring data to a second interface such as an SD Bus interface such as SDIO using a protocol such as one described in SDCard.org. The SD Bus second interface operates as a slave device to a master device, and the packet transfer from first interface to second interface includes concatenating length fields and packet data fields from packets received on the first interface to form a superframe which is provided to the second interface at time of data transfer. The formation of each superframe includes starting a timer such that the superframe is transmitted to the second interface by asserting an interrupt on that interface when either the timer expires, the number of packet from the first interface exceeds a threshold, or the amount of data from the first interface exceeds a threshold.

13 Claims, 4 Drawing Sheets

Master-Slave Configuration
Prior Art

Software Architecture for Master-Slave
Prior Art

Interrupt Process Flow
Prior Art

Concatenating Packet Processor
Prior Art typical frame processing superframe processing superframe format

SDIO Slave process

SDIO Master process

CONCATENATING SECURE DIGITAL INPUT OUTPUT (SDIO) INTERFACE

FIELD OF THE INVENTION

The present invention relates to a mechanism for use in a device connected to a host system through a Secure Digital Input Output (SDIO) interface, where data is transferred between a slave device and a master or host processor.

BACKGROUND OF THE INVENTION

Present electronic devices typically use a microprocessor as a core processing element with some sort of shared interface to a number of peripheral processing elements that jointly carry out the functionality required of the device or its application. Microprocessors come in a variety of forms, but they all share a common functionality of providing a standard interface through which other devices or peripherals can be temporarily or permanently interconnected for the exchange of information. These bus interfaces come in a variety of physical and protocol related forms.

SDIO, as specified by the SD Card Association (www.sdcard.org), is one of several interface standards that are based on a master-slave configuration. SDIO is related to the bus interface used in the Secure Digital (SD) memory card that is in turn based on the Multimedia Card (MMC) format.

The Master-Slave configuration is a common bus topology, and is also used by the protocols SDBus, MMC, and USB. In the master-slave configuration, all data transfers are initiated by a master, and the slave can only respond to commands issued by a master device. Through the use of a slave device address mechanism, multiple slaves can be connected on the same bus, as shown in FIG. 1.

Slave devices commonly respond to two broad categories of commands—write commands and read commands. Whenever the master wants to carry out a 'write', it sends the write command followed by the data to be written. The slave latches this data and carries out the required action, such as to store the data into a specified memory location, or pass the data to an intended functional block within the device. Whenever the master wants to carry out a 'read', it sends a read command accompanied by an address to be read, and the slave responds by driving the appropriate data onto the bus. In a shared bus arrangement, at any time, only one master or slave device may drive the data bus. The master as initiator of the read or write operation determines when a slave device can send data to the shared bus.

There are typically two types of slave devices in the SD family: devices with fast memory and devices with slow IO. For a fast memory type of slave device, the device master will simply provide write data accompanied by an address, or a read data address, and the response time of the device is not a concern. For slower memory devices, the data may be posted for writing at the convenience of the device, or the read operation may complete in a relatively short window of time that will not tie up the processor during the interval required for the data to be recovered and provided. A slow slave IO operation may invoke a significantly longer process, such as a read or write to a remote device across a network which may not be reachable at the time the transaction occurs, or the request for data from a device providing GPS data which includes an acquisition latency interval, or any other IO operation which has a long or unknown latency time. Because of the ability to bridge across several SDIO devices, the latency problem occurs particularly in SDIO devices which may be used as an interface through which complex functions can be provided on a separate device. These functionalities include wireless data access through WLAN, or reception of navigation data through GPS, or reception of a video stream via a DVB-H receiver. These applications involve reception of data from a network wirelessly, or preparation of data through complex processing based on some inputs from the host. When a new set of data, or a packet of data, is available to be transferred to the host, the slave has to notify this condition to the master. One of the prior art methods of notifying an event to a requesting master device is to have the master poll some address location in the slave device periodically to check if any event is pending or completed. But this method has the following disadvantages:

1) The master has to poll even when there is no event pending.

2) If polling rate is kept low to reduce the overhead on the master, events will be pending for a longer time which might not be acceptable to all slaves or the applications they provide.

Another way to communicate an event is for the slave to assert an interrupt to the host or master. This can be done either through a dedicated interface pin which can be connected to one of the interrupt sources of a processor, or through a time multiplexed input on an existing interface pin, which is a method supported by the SDIO protocol.

Interrupts asserted by a slave are routed through to an appropriate software segment in the host for processing. FIG. 2 shows the various software layers involved in a general master-slave bus topology. This architecture is suggested by various standards like SDIO and USB to ease client driver development although it is burdened with excessive overhead. The Host Controller Driver provides hardware abstraction layer functionality and is responsible for interacting with the actual host controller hardware. The Bus Controller provides a cleanly abstracted view of the client device to the client drivers and is responsible for loading the corresponding client driver when a card is detected.

FIG. 3 shows the propagation of an interrupt from the SDIO slave device 310 to the processor in the master platform via SDIO slave device driver 302. FIG. 3 also shows that a series of software processes involved in a slave asserting an interrupt 312 and the master or host processor returning to service it 302. This response latency has an impact on how quickly data can be moved from an SDIO device into the host. When a packet pending interrupt 312 is detected, the host issues a read packet command and reads the corresponding packet, following which it clears the interrupt. The sequence of events is:

1) An interrupt is asserted by the SDIO slave device 310.

2) The interrupt propagates to the device driver 302 through the master controller driver 306 and bus controller driver 304, as shown in FIG. 3.

3) For a read interrupt, the length descriptor of the pending packet is read. A read interrupt is an interrupt generated to indicate a pending packet. A slave can generate an interrupt for other reasons also, and action is taken in the host appropriately.

4) The device driver issues a packet read command to the SDIO stack (the bus controller 304 and host slave device driver 302) with the length value from step 3.

5) After the packet is read, the device driver 302 issues a write command to clear the interrupt.

6) The device driver then checks whether any further packets are pending. After the interrupt is cleared, the interrupt is immediately reasserted by the slave device if there are further packets pending. The read interrupt only indicates that one or more packets are available to be read out—it does not indicate the exact number of packets available at the time the interrupt was raised. The interrupt status is checked within the interrupt service routine (ISR) so that if further packets are available, they may be handled immediately, rather than after the ISR exits and re-enters.

7) If any further packets are pending, the handler repeats steps 3 to 6, otherwise it exits from the interrupt service routine (ISR).

The following table quantifies the delays involved in the above steps for the case of four packets which are pending in the slave device:

| No. | Step Causing Latency | Delay in uS |
|---|---|---|
| 1. | Interrupt latency to the device driver | 90 |
| 2. | First packet length descriptor read latency | 40 |
| 3. | First packet read latency of the SDIO stack | 325 |
| 4. | Interrupt clearing latency | 20 |
| 5. | Further interrupt checking latency | 20 |
| 6. | Second packet length descriptor read latency | 40 |
| 7. | Second packet read latency of SDIO stack | 325 |
| 8. | Interrupt clearing latency | 20 |
| 9. | Further interrupt checking latency | 20 |
| 10. | Third packet length descriptor read latency | 40 |
| 11. | Third packet read latency of SDIO stack | 325 |
| 12. | Interrupt clearing latency | 20 |
| 13. | Further interrupt checking latency | 20 |
| 14. | Fourth packet length descriptor read latency | 40 |
| 15. | Fourth packet read latency of SDIO stack | 325 |
| 16. | Interrupt clearing latency | 20 |
| 17. | Further interrupt checking latency | 20 |
| | Total | 1710 |

The stacked nature of the SDIO interrupt device drivers provides flexibility, but with an intrinsic inefficiency which results in long response latencies. Because of this inefficiency, the actual read throughput achievable is far less than the theoretical limit of bus throughput.

It is desired to increase SDIO bus throughput. Additionally, it is desired to decrease packet interrupt response latency.

OBJECTS OF THE INVENTION

A first object of this invention is an SDIO slave device which produces data in the form of packets to be sent to a host processor; a block of memory that stores packets and packet descriptors that are read by the master or host; an SDIO interface block that implements the SDIO standard and facilitates the exchange of data and commands through the SDIO electrical and physical interface; and a processor that carries out the functions pertaining to the organization of data packets to be sent to the host, making decisions on whether or not to concatenate packets into 'super frames', creating superframe descriptors of a predetermined format, raising appropriate interrupts to the host, and monitoring of memory occupancy and packet transfers to the host.

A second object of this invention is a device driver which reads from slave devices, writes into slave devices, and manages and controls one or more slave devices connected to the host via an SDIO interface; these facilities being offered by an SDIO stack consisting of a bus controller driver, a host controller driver, and a hardware host controller; the device driver carrying out the reception of super frames and their delineation into individual packets, the control functionality required to respond to interrupts appropriately, and other functions specific to the application performed by the slave device.

SUMMARY OF THE INVENTION

A packet controller within an SDIO slave device produces or receives data that is sent to a hierarchically higher layer residing in a host processor connected to the slave device via an SDIO interface, the packet controller acting as the SDIO bus master. The packets of data coming from the packet controller are stored in a block of random access memory internal to the slave device. A processor keeps track of these packets and organizes them into a format that enables the transfer of those packets to the host. The processor waits for multiple packets to become available in the memory, or the end of a timeout interval whichever occurs earlier, and creates a superframe descriptor that indicates to the host the number of packets available to be transferred and their individual length in bytes, after which it raises a read interrupt to the host to indicate that packets are available for reading. The SDIO device driver resident in the host acts on the interrupt and reads the superframe descriptor that is of a pre-determined length. The superframe descriptor contains information on the number of packets and lengths and the device driver reads all the packets, finally exiting the interrupt service routine only when no more packets are pending.

DETAILED DESCRIPTION OF THE INVENTION

From the delays seen in the table listed earlier, it can be seen that the latencies in the SDIO stack are quite high whereas the actual time required to transfer data on the bus is quite low. Often IO device packets are small in size, unlike the case with memory devices. The overhead of latencies well exceeds the packet transfer time in these cases. The present invention involves concatenating adjacent packets together to form a superframe so that the stack latencies can be shared by multiple packets thereby achieving higher interface throughputs. If there are several packets available to be grouped together, the throughput will be higher and closer to the theoretical throughput limit of the interface.

Figure 1:
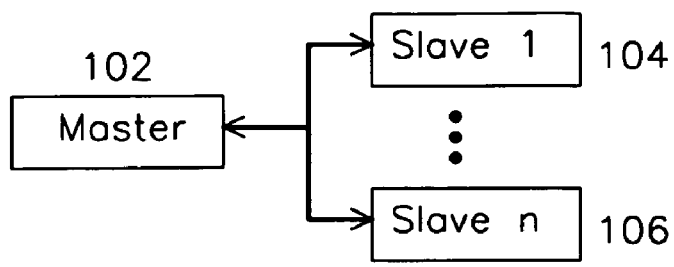
FIG. 1 is a block diagram for a general master-slave bus.
Figure 2:
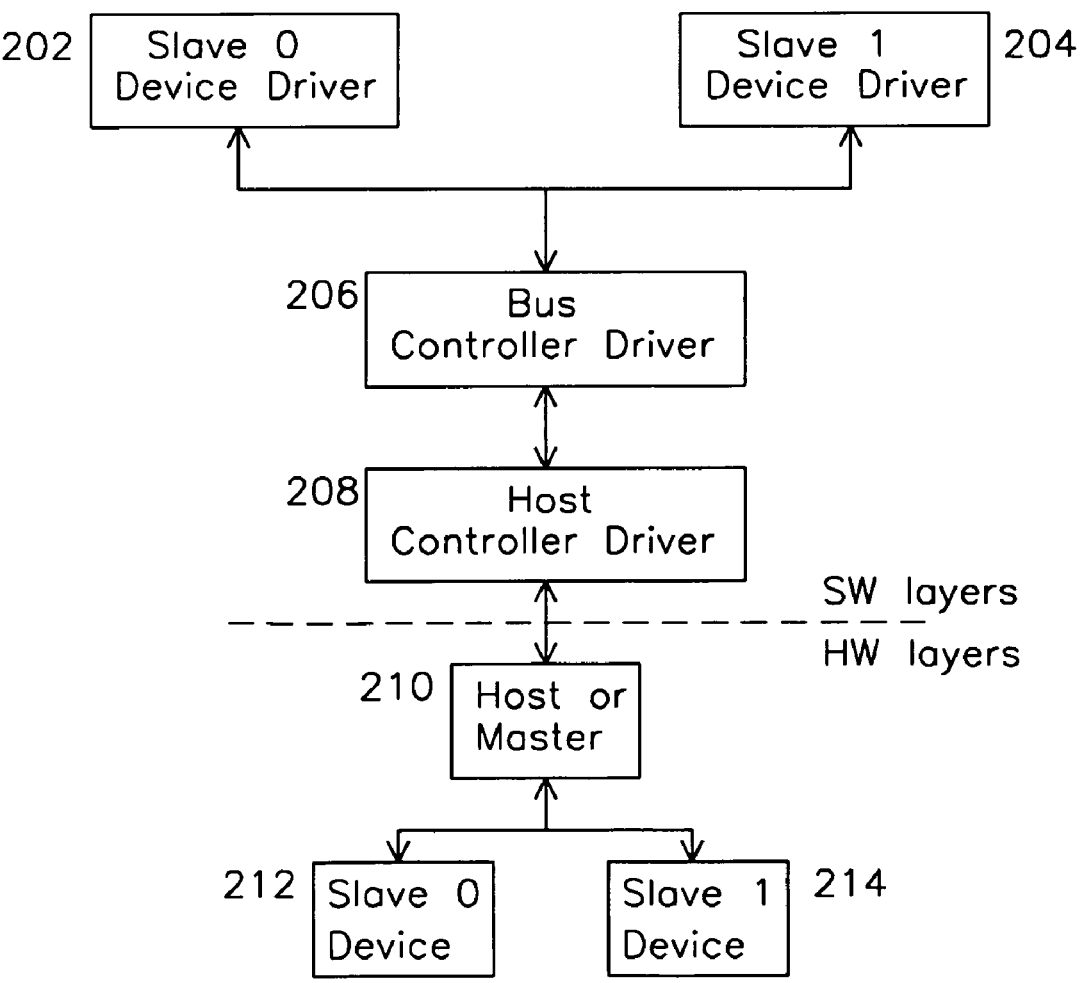
FIG. 2 is an interconnection block diagram for software layers used in a general master-slave bus topology such as FIG. 1.
Figure 3:
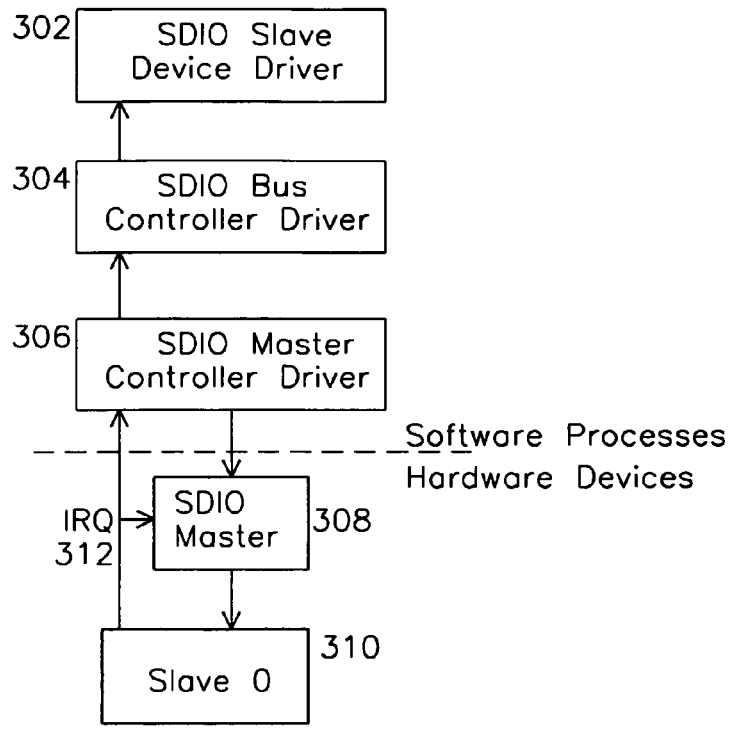
FIG. 3 is a block diagram for the propagation of interrupts from the SDIO slave device to the processor in a master platform.
Figure 4:
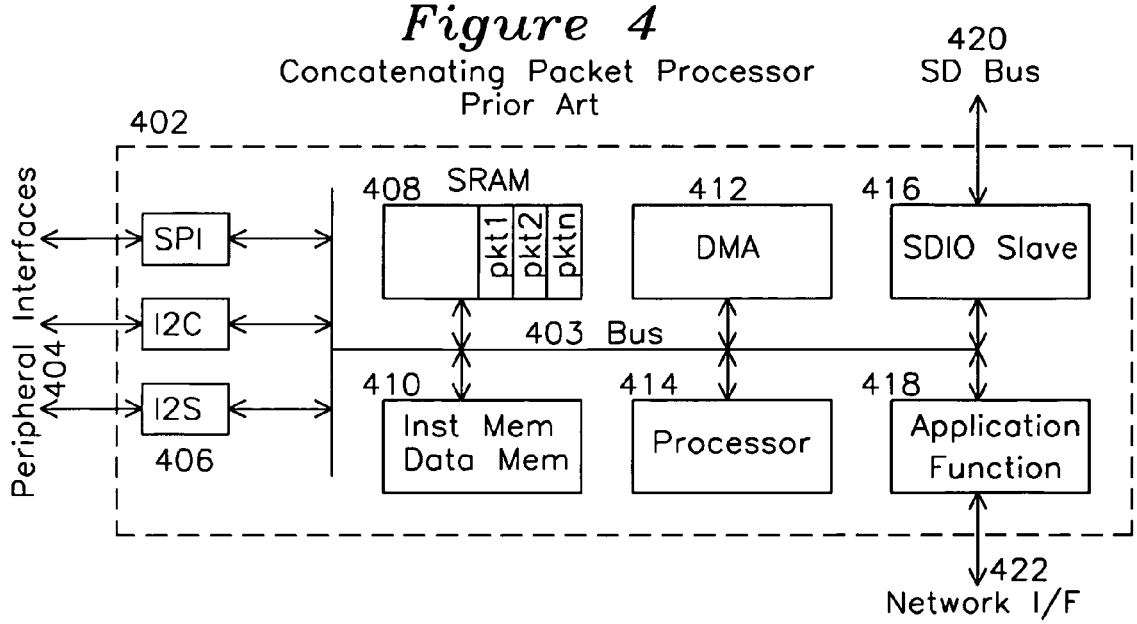
FIG. 4 is a block diagram for a processor attached to devices, some of which may use an SDIO bus.

FIG. 4 shows a slave device 402 including of a processor 414 with its associated instruction and data memory 410, a set of peripheral interfaces such as I2C, SPI, and I2S 406, a block of memory (SRAM) 408 that is used to hold data to be transferred to the host, a Direct Memory Access (DMA) controller 412 that facilitates transfer of data from one functional block to another within the subsystem 402, a host interface block 420 that carries out the SDIO slave interface functionality including bus handling, buffering, interrupt generation, and responding to host commands, and a special purpose application function 418 that handles the application functionality of the slave device.

Data packets received from the Network Interface 422 are transferred to the SRAM block where they are read out through the SDIO interface 420 by the host when indication is made that a packet or packets are available at the slave device.

Figure 5:
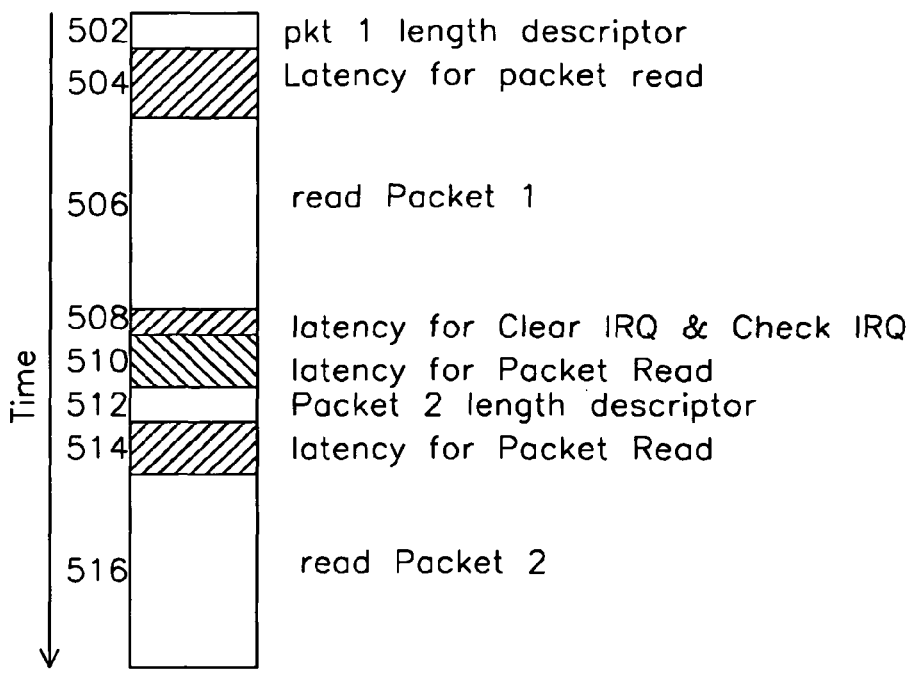
FIG. 5 is a time sequence diagram for a prior art method for reading a plurality of packets.

One method of reading newly arrived packets is shown in FIG. 5 for an interrupt service routine handling the newly arrived packet. The packet controller forms a packet descriptor that contains the length of the packet, and asserts an interrupt. The host thereafter executes an interrupt service routine which reads the packet descriptor 502 and then reads the actual packet 506 following a read latency 504. At the end of reading the packet 506, the interrupt service routine performs a write to clear the interrupt 508 and once again checks the interrupt to see if it is still asserted, which indicates that another packet is pending such as packet 2 512 after a read latency 510 and 514, after which the second packet 516 is read.

Figure 6:
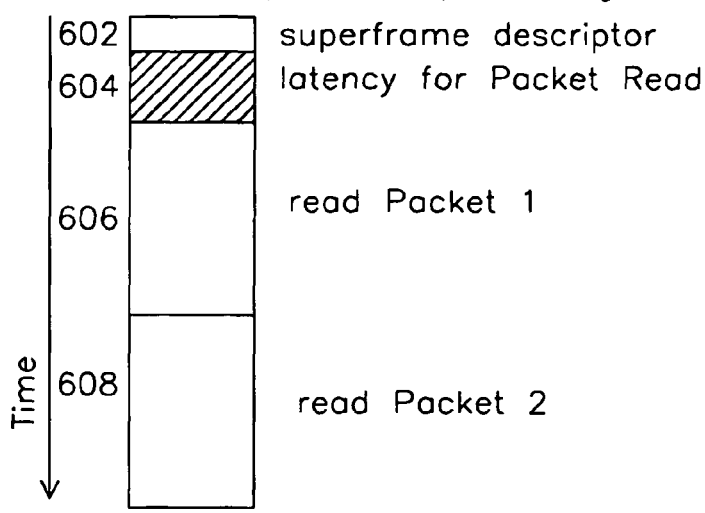
FIG. 6 is a time sequence diagram for reading packet according to the present invention.
Figure 7:
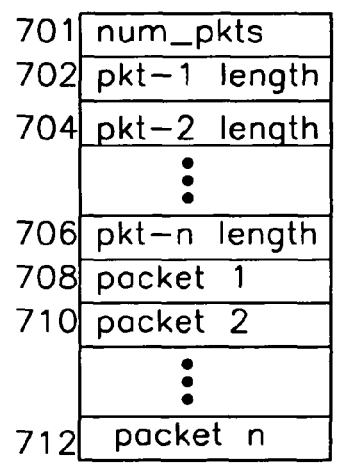
FIG. 7 shows the frame structure of a superframe descriptor.

Another method for a packet controller generates a 'superframe' that contains several packets from the set of previously arrived packets. FIG. 6 shows the structure of this superframe and also indicates the sequence by which a descriptor 602 is read, followed by a read latency 604, after which the first packet 606 is read immediately followed by second packet 608. It can be seen in comparison with FIG. 5 that this concatenation and read sequence avoids the extra delays incurred in the host performing the interrupt handling and other preparatory activities for each subsequent packet. FIG. 7 shows the structure of the superframe descriptor, which includes the number packets in the superframe 701, the packet lengths 702, 704 through 706 concatenated together, followed by the packets 708, and 710 through 712.

The slave driver reads the superframe descriptor of FIG. 7 and first decodes the number for packets that are being transferred in a single event. The number of packets can also be just one for cases where the slave device does not find more than one packet available in its buffer. After reading the superframe descriptor the slave driver adds the lengths of the individual packets pkt-1 through pkt-n to get total the length of the superframe. The slave further uses the lengths of the individual packets to denote the boundaries of the individual packets within the superframe. The concatenated packets need not be related to each other, but are individual data packets which are provided separately to the software layer above the device driver. The size of the descriptor establishes a limit to the number of packets that can form a superframe. The present invention uses a descriptor size of 16 bytes, but this number can be changed with the overall benefits still accruing. The number of frames that are thus concatenated governs the extent of throughput advantage obtained.

The quantum of throughput gain achieved by this mechanism can be computed using the following table. In this example, four packets are sent together in one superframe.

| No. | Step causing latency | Delay in us |
|-----|---------------------|-------------|
| 1. | Interrupt response | 90 |
| 2. | Superframe descriptor read | 50 |
| 3. | Superframe read by the SDIO stack | 1026 |
| 4. | Clearing of Interrupt | 20 |
| 5. | Further interrupt checking | 20 |
|    | Total | 1306 |

The time taken to complete the transfer of four packets here is 1306 microseconds, and when it is compared to what is shown in the earlier table, it can be seen that the present invention reduces delay in this example by approximately 23%, which results in a corresponding throughput increase.

The throughput advantage of the invention is realized when slave device receives packets from its application such as through interface 422 at a higher rate than at which the host reads out packets from it through interface 420. In addition to providing throughput benefits, the present invention also results in a reduction in the amount of processing to be performed in the host for a given amount of data transfer. The slave device employing the present invention waits until multiple packets are available in its receive buffer space before forming the superframe to send to the host. If a packet sufficient to complete the superframe has not arrived on interface 422 during a timeout interval of time, the concatenation process stops and signals to SD Bus 420 interface the availability of a packet.

In one embodiment of the invention, the packet processor employs the following steps:

1) start timeout timer;

2) concatenate packets received from network interface 422 into a superframe as shown in FIG. 7, whereby packets received from network interface 422 have a length and a payload, the concatenation resulting in a series of length values followed by a series of corresponding payload fields, the concatenation continuing until the timeout timer expires or a threshold is passed, the threshold corresponding either to a number of packets or a total packet size;

3) if the timeout timer expires or the threshold is passed, signaling to the host processor such as through SD Bus 420 that a superframe is ready for transfer;

4) transferring the superframe across the SD Bus 420.

The superframe format of FIG. 7 as transmitted across the SD Bus 420 may be assembled directly from SRAM 408, or the generation of the superframe may rely on a series of pointers which point to the associated packet and length in SRAM 408. In this manner, the packets may be received and stored in SRAM by the processor or DMA 412 according to one organization method, and the superframe described by an independent method such as by indicating start and end locations for each packet as each packet is added to the superframe by concatenating start and end locations, and then forming the superframe at transfer time by having the sending process pick up each start and end location pair, using them to first form the sequence of lengths 702 through 706, and then using them to read associated data for transferal across the interface, thereby reducing the number of data copy operations. The packet data is thereby read once during transfer from network interface 422 to SRAM 408, and then again at the time it is moved from SRAM 408 to SD Bus 420 after the superframe has been completed either by a set of packet descriptors or by packet start/end pointer pairs. Additionally, the superframe of FIG. 7 includes a field 701 indicating the number of packets enclosed, or a delimiter after the last pkt-n length field 706 so the receiver of the superframe is able to distinguish between lengths 702 through 706 and packets 708 through 712.

In this manner, the number of separate software events which occur across SD Bus 420 is correspondingly reduced from those shown in FIG. 5 to those shown in FIG. 6.

Figure 8:
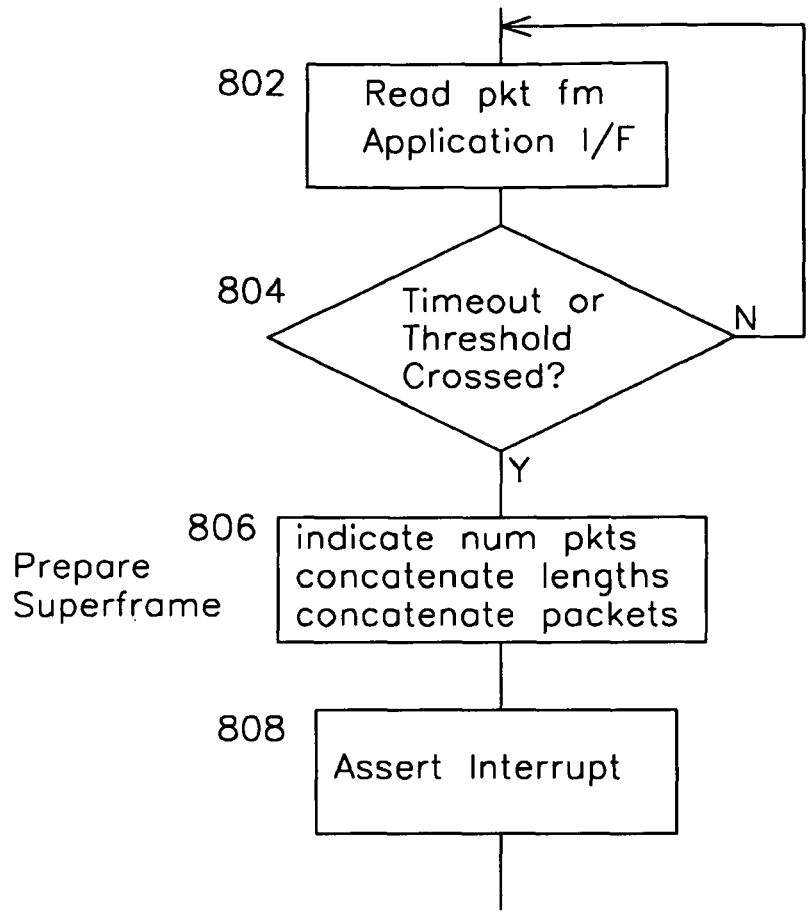
FIG. 8 shows a flowchart for a process performed by a packet processor for forming superframes.

FIG. 8 shows a process for forming superframes according to the present invention. Each packet is read from the application or network interface in step 802, and a timeout or threshold crossing test 804 determines whether to form a superframe in step 806 or continue reading additional packet 802, which may be placed in memory, as described earlier. Once the superframe is formed in step 806, an interrupt to the SDIO master is asserted in step 808.

Figure 9:
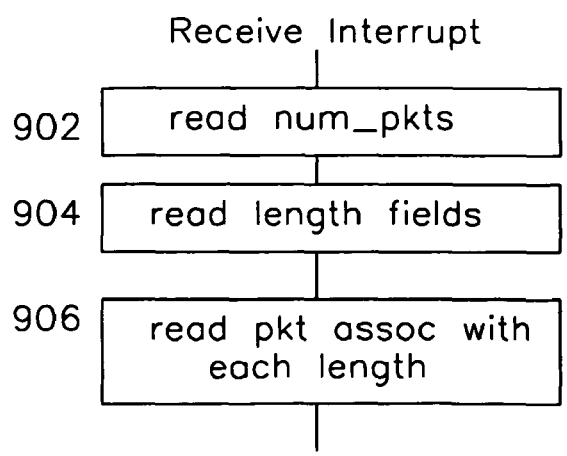
FIG. 9 shows a flowchart for a process performed by a master device interrupt service routine for transferring superframes.

FIG. 9 shows the SDIO master process, where upon receipt of the interrupt asserted in FIG. 8, the superframe is read to determine the number of packets contained therein in step 902, after which each length field is read 904, and the packet associated with each length are read in step 906.

What is claimed is:

1. A packet processor for accepting consecutively received original packets from a first interface and transferring them to a second interface using a superframe, said second interface having an interrupt, the packet processor having:
    a memory coupled to a processor and DMA engine;
    a timer which is initialized upon start of a superframe;
    whereby for each incoming packet, said packet is transferred from said first interface to said memory by either said DMA engine or said processor, and where a packet descriptor for said packet is created, said packet descriptor having, in sequence:
    a first value set to the number of packets in the superframe;
    a first part comprising:
        a consecutive sequence of length values, each of said length values corresponding to the length of an original packet of said consecutively received original packets, each said consecutively received original packets having an original packet header and an original packet payload which is unmodified from said first interface original packet;
    a second part comprising said unmodified original packets concatenated into a contiguous block, the number of said unmodified original packets corresponding to said first value and the length and order of each said unmodified original packet corresponding to said first part sequence of length values;
    such that when either said superframe timer expires, the number of packets in said superframe exceeds a threshold, or the size of said superframe exceeds a threshold, said interrupt is asserted and said superframe is transferred to said second interface during a single transfer event.

2. The packet processor of claim 1 where said packet descriptor and said superframe are stored in said memory after receipt from said first interface.

3. The packet processor of claim 1 where each packet received on said first interface results in a packet length being stored in a first linear array and said packets being stored in a second linear array.

4. The packet processor of claim 1 where said first interface is a network interface and said second interface operates according to an SD Bus interface.

5. A process for packet transfer, the process having the steps:
    a step of receiving demodulated packets from a first interface coupled to a wireless receiver and accepting said demodulated packets from a wireless interface, each said packet having a header and a payload, each said demodulated packet formed without modification of said packet header, the first interface storing said demodulated packets in a memory and also forming a superframe, said superframe having, in sequence, a value N representing the number of packets currently in said superframe; a series of N contiguous length values; a series of N said demodulated packets concatenated together, each of said N demodulated packets having a corresponding length represented, in sequence, by said series of N contiguous length values;
    a step of starting a timer upon receipt of a first said demodulated packet of said superframe, and when a threshold is crossed, or when said threshold is not crossed but said timer has expired:
    a step of transmitting said superframe to a second interface when said timer expires or when said N exceeds a threshold value, thereafter resetting said timer.

6. The process of claim 5 where said threshold is less than the capacity of said memory to store said superframe.

7. The process of claim 5 where said first interface is a network interface and said second interface is operates according to an SD Bus interface.

8. The process of claim 5 where said second interface is a bus slave operative according to instructions from a bus master.

9. The process of claim 5 where said second interface includes an interrupt which is asserted when either said threshold is exceeded or said timer expires, said interrupt causing the transmission of said superframe across said second interface.

10. The process of claim 5 where said N is greater than 2.

11. The process of claim 1 where said number of packets in said superframe is greater than 2.

12. The process of claim 1 where after said superframe is transferred, said memory is initialized for the formation of a new superframe.

13. The process of claim 5 where after said superframe is transferred, said memory is initialized for the formation of a new superframe.

* * * * *